US011632496B2

(12) United States Patent
Horie

(10) Patent No.: US 11,632,496 B2
(45) Date of Patent: Apr. 18, 2023

(54) IMAGE PICKUP APPARATUS FOR DETECTING LINE-OF-SIGHT POSITION, CONTROL METHOD THEREFOR, AND STORAGE MEDIUM

(71) Applicant: CANON KABUSHIKI KAISHA, Tokyo (JP)

(72) Inventor: Nobuyuki Horie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/727,421

(22) Filed: Apr. 22, 2022

(65) Prior Publication Data

US 2022/0353426 A1    Nov. 3, 2022

(30) Foreign Application Priority Data

Apr. 30, 2021    (JP) .............................. JP2021-077482

(51) Int. Cl.
H04N 5/232    (2006.01)

(52) U.S. Cl.
CPC ... *H04N 5/232127* (2018.08); *H04N 5/23219* (2013.01); *H04N 5/232941* (2018.08)

(58) Field of Classification Search
CPC ....... H04N 5/232941; H04N 5/232127; H04N 5/23219; H04N 5/23209; H04N 5/23261; H04N 5/23245; H04N 5/23254; H04N 5/23218; H04N 5/232125; H04N 5/23287; H04N 5/23258; G06F 3/013
USPC ................................................... 348/333.03
See application file for complete search history.

(56) References Cited

U.S. PATENT DOCUMENTS

| 8,564,533 B2* | 10/2013 | Yuan ..................... G06F 3/0481 |
| | | 345/660 |
| 10,977,488 B2* | 4/2021 | Hirata .................. G06V 20/597 |
| 11,023,038 B2* | 6/2021 | Yasuda ..................... G06F 3/01 |
| 11,209,901 B2* | 12/2021 | Klingström .......... H04N 5/2256 |
| 11,442,244 B2* | 9/2022 | Kojima .................. G03B 13/36 |

(Continued)

FOREIGN PATENT DOCUMENTS

| JP | 2004-008323 A | 1/2004 |
| JP | 2015-152938 A | 8/2015 |

*Primary Examiner* — Pritham D Prabhakher
(74) *Attorney, Agent, or Firm* — Cowan, Liebowitz & Latman, P.C.

(57) ABSTRACT

The image pickup apparatus, a control method therefor, and a storage medium capable of maintaining detection accuracy of a line-of-sight position at the time of calibration even in a case where a focus controllable range changes due to a difference in a detachably mounted accessory. At a camera housing 1B, correction information about an individual difference of an eyeball is acquired by calibration based on a display position of an index in a finder thereof and a position of line-of-sight, of a user, detected by a line-of-sight detection circuit 201, the position of line-of-sight being poured into the index, and correction of the detected position of line-of-sight is performed using the correction information. Then, a position of line-of-sight, of the user, detected by the line-of-sight detection circuit 201, the line-of-sight position being poured into a through image is set to a focal frame. When one of the accessories is mounted thereon, a method for the calibration is changed according to a focus detection region acquired from the mounted accessory.

14 Claims, 14 Drawing Sheets

(56) References Cited

U.S. PATENT DOCUMENTS

| | | | |
|---|---|---|---|
| 11,457,148 B2* | 9/2022 | Yaguchi | H04N 5/232125 |
| 11,496,668 B2* | 11/2022 | Kimura | G06V 30/242 |
| 11,509,816 B2* | 11/2022 | Ebata | H04N 5/23293 |
| 2002/0057908 A1* | 5/2002 | Otani | G03B 13/02 |
| | | | 396/51 |
| 2011/0006978 A1* | 1/2011 | Yuan | G06F 3/0481 |
| | | | 351/209 |
| 2018/0032131 A1* | 2/2018 | Yasuda | B60K 37/06 |
| 2018/0173949 A1* | 6/2018 | Jeong | G06V 10/17 |
| 2019/0026589 A1* | 1/2019 | Sugihara | G06T 19/20 |
| 2019/0083335 A1* | 3/2019 | Zhang | A61G 5/04 |
| 2020/0257359 A1* | 8/2020 | Klingström | G06T 7/251 |
| 2020/0327324 A1* | 10/2020 | Hirata | G06V 20/653 |
| 2021/0051265 A1* | 2/2021 | Kimura | H04N 5/232122 |
| 2021/0084226 A1* | 3/2021 | Yaguchi | H04N 5/23209 |
| 2021/0124239 A1* | 4/2021 | Sudo | G06T 7/70 |
| 2021/0127063 A1* | 4/2021 | Ogawa | H04N 5/23299 |
| 2021/0223860 A1* | 7/2021 | Fujiwara | H04N 5/232127 |
| 2021/0243361 A1* | 8/2021 | Ebata | H04N 5/232935 |
| 2021/0306568 A1* | 9/2021 | Inukai | H04N 5/232945 |

* cited by examiner

IMAGE PICKUP APPARATUS FOR DETECTING LINE-OF-SIGHT POSITION, CONTROL METHOD THEREFOR, AND STORAGE MEDIUM

BACKGROUND OF THE INVENTION

Field of the Invention

The present invention relates to an image pickup apparatus configured to detect a line-of-sight position, a control method therefor, and a storage medium, and more particularly, to an image pickup apparatus configured to perform focus control based on information about a detected line-of-sight position, a control method therefor, and a storage medium.

Description of the Related Art

In recent years, automation and intelligence of an image pickup apparatus have progressed, and an image pickup apparatus capable of recognizing a subject intended by a user based on information about a line-of-sight position of the user looking into a finder and performing focus control without manually inputting a subject position has been proposed. At this time, when the image pickup apparatus detects the line-of-sight position of the user, a deviation occurs between the line-of-sight position intended by the user and the line-of-sight position of the user recognized by the image pickup apparatus, and there is a case where it is difficult to focus on the subject intended by the user.

On the other hand, there is known a technique in which an index is displayed in a finder before shooting, an instruction to gaze at the index is issued to a user, a line-of-sight position of the user is detected in the gaze state, calibration for detecting a deviation amount from the index position is executed, and then, at the time of shooting, the line-of-sight position of the user recognized by the image pickup apparatus is corrected by the detected deviation amount, so that the corrected line-of-sight position is set to a line-of-sight position more as intended by the user (see, for example, Japanese Laid-Open Patent Publication (kokai) No. 2004 008323).

In addition, there is known a technique of determining detection accuracy of a line-of-sight position, and varying a display form of a display object according to the determined detection accuracy so that a line-of-sight position unintended by a user is not selected (see, for example, Japanese Laid-Open Patent Publication (kokai) No. 2015-152938). Specifically, since the accuracy of the calibration increases in the vicinity of the index that the user has gazed at the time of calibration, the overall accuracy of the calibration increases as the number of indexes increases. However, as the index increases, the number of operations requested to the user at the time of calibration increases, and the burden on the user increases. Therefore, in Japanese Laid-Open Patent Publication (kokai) No. 2015-152938, the detection accuracy of the line-of-sight position is determined, and the display object is sparsely displayed at the portion where the determined detection accuracy is low, and the display object is densely displayed at the portion where the determined detection accuracy is high.

However, in the calibration of Japanese Laid-Open Patent Publication (kokai) No. 2004 008323, a difference in a focus controllable range due to a difference in accessories detachably mounted on the image pickup apparatus is not considered.

For example, in a case where the taking lens mounted on the image pickup apparatus at the time of calibration is a 35 mm full-size sensor taking lens, the focus controllable range is 36 mm in length and 24 mm in width. On the other hand, in the case of the APS-C sensor taking lens, the focus controllable range is about 15.5 mm in length and about 23.3 mm in width. That is, the latter has a smaller focus controllable range than the former.

Therefore, when the index is displayed at the same position in the finder at the time of calibration regardless of the taking lens mounted on the image pickup apparatus, there is a problem that the calibrated index is out of the focus controllable range. This problem may also occur in a case where a plurality of taking lenses having the same target sensor but different performances can be mounted on the image pickup apparatus. On the other hand, when the number of indexes is increased in order to improve the accuracy, calibration takes time and a burden on the user increases accordingly.

On the other hand, in Japanese Laid-Open Patent Publication (kokai) No. 2015-152938, for example, it is possible to prevent erroneous detection of the line-of-sight position by increasing the focal frame at a portion where detection accuracy of the line-of-sight position is poor, but there is a problem that focus control desired by the user cannot be performed when the focal frame is large.

SUMMARY OF THE INVENTION

Therefore, the present invention provides an image pickup apparatus, a control method therefor, and a storage medium capable of maintaining detection accuracy of a line-of-sight position at the time of calibration even in a case where a focus controllable range changes due to a difference in a detachably mounted accessory.

Accordingly, the present invention provides an image pickup apparatus including a finder inside, the image pickup apparatus on which a plurality of accessories is detachably mounted, the image pickup apparatus comprising at least one processor, and a memory coupled to the at least one processor, the memory having instructions causing the processor to perform the operations as a line-of-sight detection unit configured to detect a position of line-of-sight, of a user, poured into the finder, a calibration unit configured to display an index for calibration work on the finder, acquire correction information about an individual difference of an eyeball by calibration based on a display position of the index in the finder and a position of line-of-sight, of the user, detected by the line-of-sight detection unit, the position of line-of-sight being poured into the index, and perform correction of the detected position of line-of-sight using the correction information, a setting unit configured to display a through image on the finder, and set to a focal frame, a position of line-of-sight, of the user, detected by the line-of-sight detection unit, the line-of-sight position being poured into the through image, and a focus detection region acquisition unit configured to acquire, when one of the accessories is mounted on the image pickup apparatus, a focus detection region from the mounted accessory, wherein the calibration unit changes a method for the calibration according to the acquired focus detection region.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

First Embodiment

Hereinafter, with reference to FIGS. 1 to 11, calibration in a case where a focus controllable range changes due to a difference in accessories detachably mounted on the camera housing according to first embodiment of the present invention will be described. It should be noted that in the present embodiment, the taking lens is exemplified as an accessory, but the accessory is not limited thereto as long as the accessory according to which the focus range controllable by the image pickup apparatus changes is provided. For example, in a case where an extender as an accessory is mounted between the camera housing and the taking lens, calibration described below is executed.

A configuration of an image pickup system 1 including a taking lens 1A as one of accessories and a camera housing 1B as an image pickup apparatus on which the taking lens 1A is detachably mounted will be described with reference to FIGS. 1 to 3.

Figure 2A:
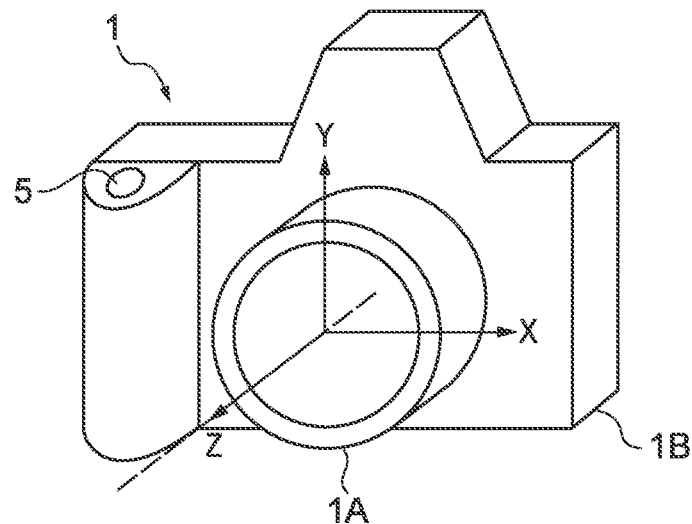
FIGS. 2A to 2C are diagrams showing an appearance of the image pickup system.
Figure 2B:
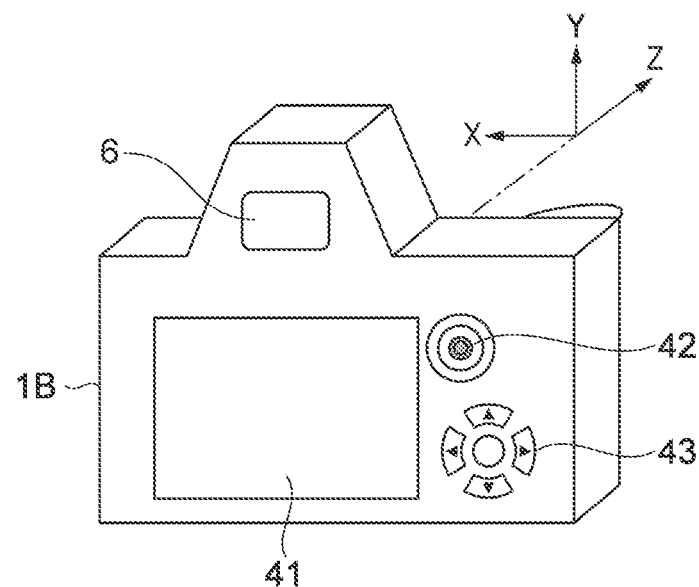
Figure 2C:
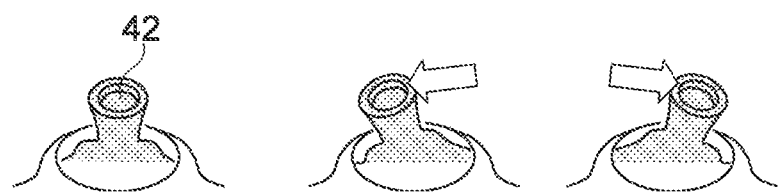

FIGS. 2A to 2C are diagrams showing an appearance of the image pickup system 1, FIG. 2A is a front perspective view, FIG. 2B is a rear perspective view, and FIG. 2C is a diagram for explaining an operation member 42 in FIG. 2B.

As shown in FIG. 2A, a release button 5 is provided on the front face of the camera housing 1B.

The release button 5 is an operation member that receives an image pickup operation from the user.

As shown in FIG. 2B, an eyepiece window 6 and operation members 41 to 43 are provided on the back face of the camera housing 1B.

The eyepiece window 6 is a window for the user to look into a visual recognition image displayed on a finder 10 described later with reference to FIG. 1 included in the camera housing 1B.

The operation member 41 is a touch panel compatible liquid crystal, the operation member 42 is a lever type operation member, and the operation member 43 is a button type cross key. It should be noted that in the present embodiment, the operation members 41 to 43 used for camera operation such as movement control by a manual operation of a focal frame on the finder 10 described later are provided in the camera housing 1B, but the present invention is not limited thereto. For example, another operation member such as an electronic dial may be further provided in the camera housing 1B or provided instead of the operation members 41 to 43.

Figure 1:
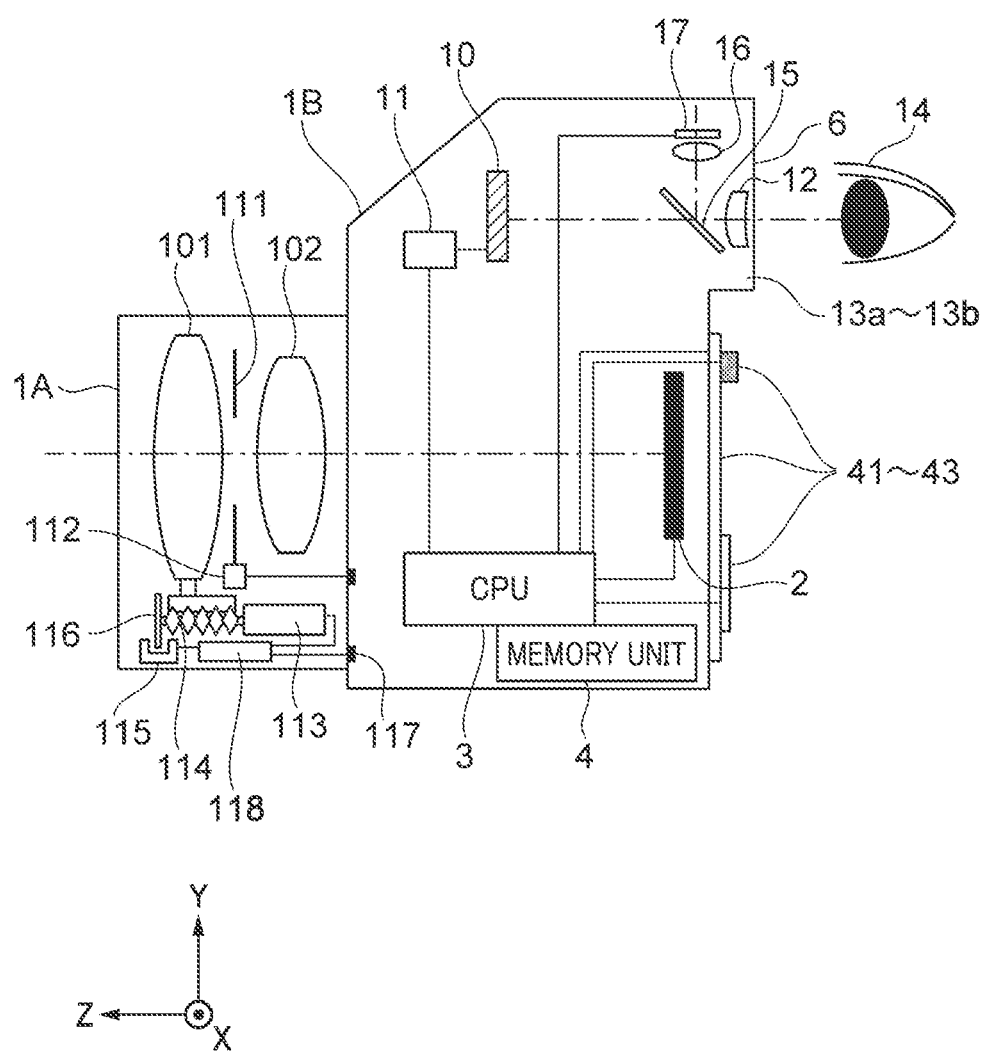
FIG. 1 is a diagram schematically showing an internal configuration of an image pickup system according to a first embodiment.

FIG. 1 is a cross-sectional view of a camera housing 1B taken along a YZ plane formed by a Y axis and a Z axis shown in FIG. 2A, and is a diagram showing an outline of an internal configuration of the image pickup system 1. It should be noted that in FIG. 1, the same components as those in FIGS. 2A to 2C are denoted by the same reference numerals.

In FIG. 1, the taking lens 1A is a taking lens detachably mounted on the camera housing 1B. In the present embodiment, only the two lenses 101, 102 are shown as the lenses inside of the taking lens 1A for the sake of convenience, but it is well known that the taking lens 1A is actually constituted by a larger number of lenses.

The camera housing 1B includes an image pickup device 2, a CPU 3, a memory unit 4, a finder 10, a finder drive circuit 11, an eyepiece 12, light sources 13a to 13b, a light divider 15, a light receiving lens 16, and an ocular image pickup device 17 therein.

The image pickup device 2 is disposed on the planned imaging plane of the taking lens 1A and picks up an image. In addition, the image pickup device 2 also serves as a photometric sensor.

The CPU 3 is a central processing unit of a microcomputer that controls the entire image pickup system 1.

The memory unit 4 records an image picked up by the image pickup device 2. Furthermore, the memory unit 4 stores imaging signals from the image pickup device 2 and the ocular image pickup device 17, and correction information (line-of-sight correction coefficients Ax, Bx, Ay, By) for correcting an individual difference of a line of sight to be described later.

The finder 10 includes a display element such as a liquid crystal for displaying an image (through image) picked up by the image pickup device 2.

The finder drive circuit 11 is a circuit that drives the finder 10.

The eyepiece 12 is a lens for the user to look into and observe the visual recognition image displayed on the finder 10 through the eyepiece window 6 (FIG. 2B).

The light sources 13a to 13b are light sources including infrared light emitting diode for illuminating an eyeball 14 of the user in order to detect the line-of-sight direction of the user, and are disposed around the eyepiece window 6 (FIG. 2B). Corneal reflection images (Purkinje images) Pd and Pe (FIG. 5) of the light sources 13*a* to 13*b* are formed on the eyeball 14 by turning on the light sources 13*a* to 13*b*. In this state, light from the eyeball 14 is transmitted through the eyepiece 12 and is reflected by a light divider 15, and an eye image including an eyeball image is formed on an ocular image pickup device 17 (generation unit) in which a photoelectric element array such as a CMOS is two-dimensionally disposed by a light receiving lens 16, and eye image data is generated. The light receiving lens 16 positions the pupil of the eyeball 14 of the user and the ocular image pickup device 17 in a conjugate imaging relationship. A line-of-sight detection circuit 201 (line-of-sight detection unit: FIG. 3) detects the line-of-sight direction (the viewpoint of the user poured into the visual recognition image, hereinafter referred to as a first estimated gaze point position) from the position of the corneal reflection image in the eyeball image formed on the ocular image pickup device 17 by a predetermined algorithm to be described later.

The light divider 15 is configured to reflect the light transmitted through the eyepiece 12 to form an image on the ocular image pickup device 17 via the light receiving lens 16 to transmit the light from the finder 10 to allow the user to view the visual recognition image displayed on the finder 10.

The taking lens 1A includes a diaphragm 111, a diaphragm drive device 112, a lens driving motor 113, a lens drive member 114 including a drive gear and the like, a photocoupler 115, a pulse plate 116, a mount contact 117, and a focus adjustment circuit 118.

The photocoupler 115 detects the rotation of the pulse plate 116 interlocked with the lens drive member 114 to transmit information on the rotation to the focus adjustment circuit 118.

The focus adjustment circuit 118 drives the lens driving motor 113 by a predetermined amount based on the information from the photocoupler 115 and the information about the lens drive amount from the camera housing 1B, and moves the taking lens 1A to the in-focus position.

The mount contact 117 is an interface between the camera housing 1B and the taking lens 1A, and has a known configuration. A signal is transmitted between the camera housing 1B and the taking lens 1A via the mount contact 117. The CPU 3 of the camera housing 1B acquires the type information, the optical information, and the like of the taking lens 1A to determine the range in which the taking lens 1A mounted on the camera housing 1B can focus.

Figure 3:
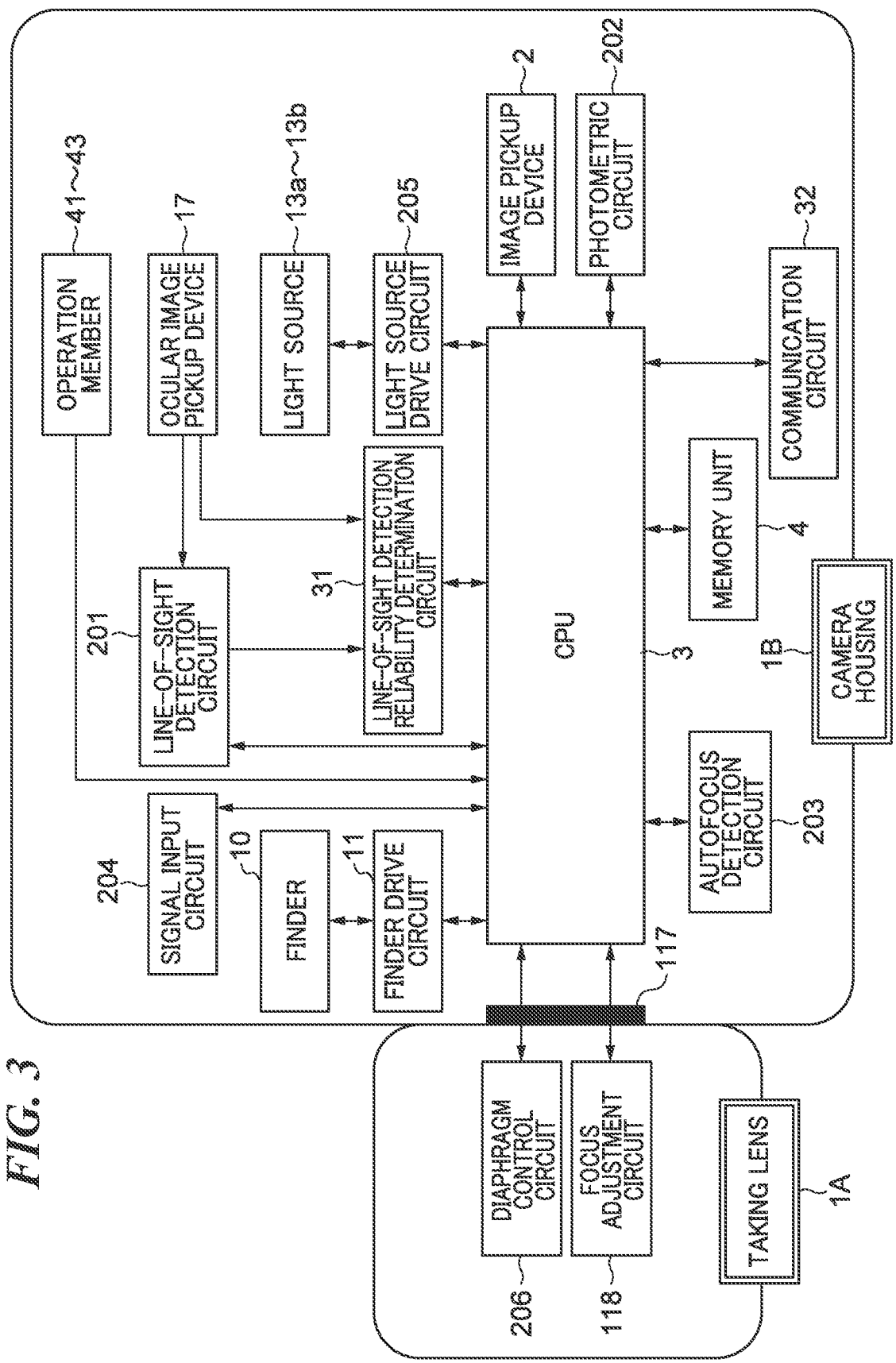
FIG. 3 is a block diagram showing an electrical configuration built in the image pickup system.

FIG. 3 is a block diagram showing an electrical configuration built in the image pickup system 1. It should be noted that in FIG. 3, the same components as those in FIGS. 1 and 2A to 2C are denoted by the same reference numerals.

The camera housing 1B includes the line-of-sight detection circuit 201, a photometric circuit 202, an autofocus detection circuit 203, a signal input circuit 204, the finder drive circuit 11, a light source drive circuit 205, a line-of-sight detection reliability determination circuit 31, and a communication circuit 32, which are each connected to the CPU 3. In addition, the taking lens 1A includes the focus adjustment circuit 118 and a diaphragm control circuit 206 included in the diaphragm drive device 112 (FIG. 1), and they transmit and receive signals to and from the CPU 3 of the camera housing 1B via the mount contact 117.

The line-of-sight detection circuit 201 performs A/D conversion on the eye image data formed to output on the ocular image pickup device 17 to transmit the eye image data to the CPU 3. The CPU 3 extracts each feature point of the eye image necessary for line-of-sight detection from the eye image data according to a predetermined algorithm to be described later, and further calculates a line-of-sight position (first estimated gaze point position) of the user estimated from the position of each extracted feature point.

The photometric circuit 202 amplifies a luminance signal output corresponding to the brightness of the field based on a signal obtained from the image pickup device 2 also serving as a photometric sensor, then performs logarithmic compression and A/D conversion on the output, and sends it to the CPU 3 as field luminance information.

The autofocus detection circuit 203 performs A/D conversion on signal voltages from a plurality of pixels included in the image pickup device 2 and used for phase-difference detection, and sends the converted signal voltages to the CPU 3. The CPU 3 calculates, from the converted signal voltages from the plurality of pixels, the distance to the subject corresponding to each focus detection point. This is a known technique known as imaging face phase-difference AF. In the present embodiment, there are 180 focus detection points on the imaging face of the finder 10 as shown in the in-finder field of view image (visual recognition image) shown in FIGS. 4A to 4C.

The signal input circuit 204 is connected to switches SW1 and SW2 (not shown). The switch SW1 is a switch that is turned on with the first stroke of the release button 5 (FIG. 2A) to start photometry, distance measurement, line-of-sight detection operation, and the like of the image pickup system 1. The switch SW2 is a switch that is turned on with the second stroke of the release button 5 to start the release operation. Signals from the switches SW1 and SW2 are input to the signal input circuit 204 and transmitted to the CPU 3.

The line-of-sight detection reliability determination circuit 31 (reliability determining unit) determines the reliability of the first estimated gaze point position calculated by the CPU 3. This determination is executed based on a difference between two pieces of eye image data, that is, eye image data acquired at the time of calibration described later and eye image data acquired at the time of shooting. Specifically, the difference here is a difference in the size of the pupil diameter, a difference in the number of corneal reflection images, and a difference in the entrance of external light detected from each of the two pieces of eye image data. More specifically, the pupil end is calculated by a line-of-sight detection method described later with reference to FIGS. 5 to 7. For example, in a case where the number of extracted pupil ends is equal to or larger than a threshold value, it is determined that the reliability is high, and otherwise, it is determined that the reliability is low. This is because the estimation is performed as the pupil 141 (FIG. 5) of the eyeball 14 of the user by connecting the pupil ends, and the estimation accuracy increases as the number of pupil ends that can be extracted increases. In addition, the reliability may be determined by how much the pupil 141 calculated by connecting the pupil ends is distorted with respect to the circle. In addition, as another method, it may be determined that the reliability is high in the vicinity of an index that the user is caused to gaze at the time of calibration described later, and the reliability is low as the distance from the index increases. When transmitting the line-of-sight position information about the user calculated by the line-of-sight detection circuit 201 to the CPU 3, the line-of-sight detection reliability determination circuit 31 transmits the reliability of the line-of-sight position information to the CPU 3.

The communication circuit 32 communicates with a PC (not shown) on a network via a network (not shown) such as a LAN or the Internet based on the control of the CPU 3.

In addition, the operation members 41 to 43 described above is configured to transmit the operation signal to the CPU 3, and movement control or the like by the manual operation of the first estimated gaze point position described later is performed accordingly.

Figure 4A:
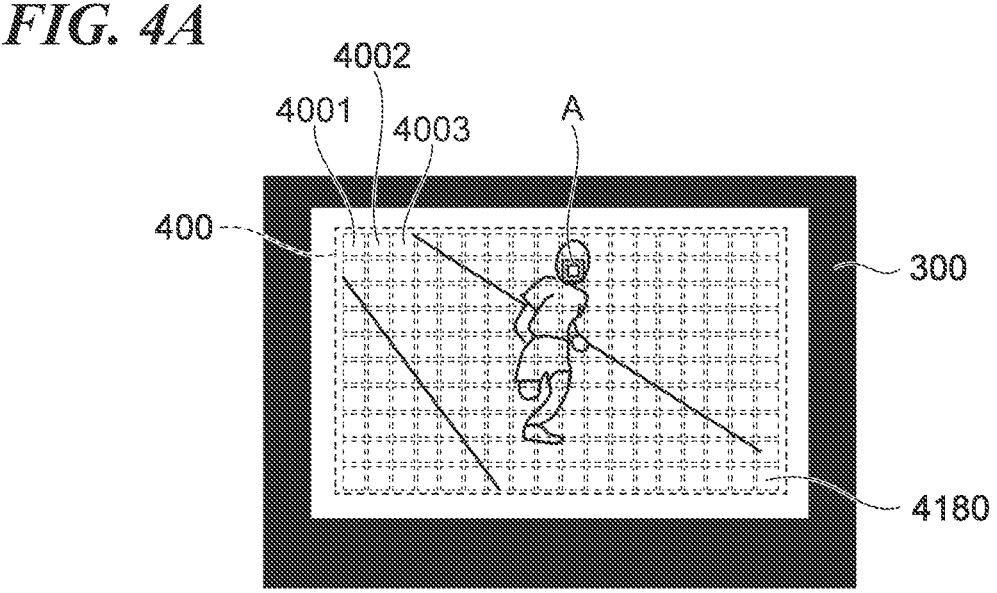
FIGS. 4A to 4C are diagrams showing an in-finder field of view in a state where the finder in FIG. 3 is operated.
Figure 4B:
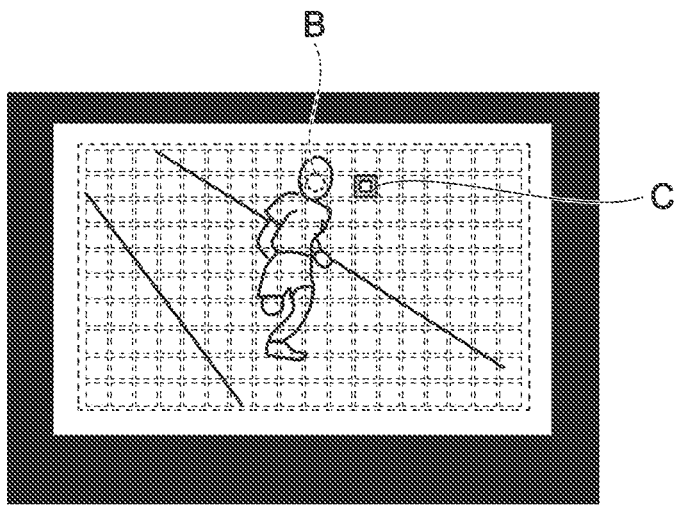
Figure 4C:
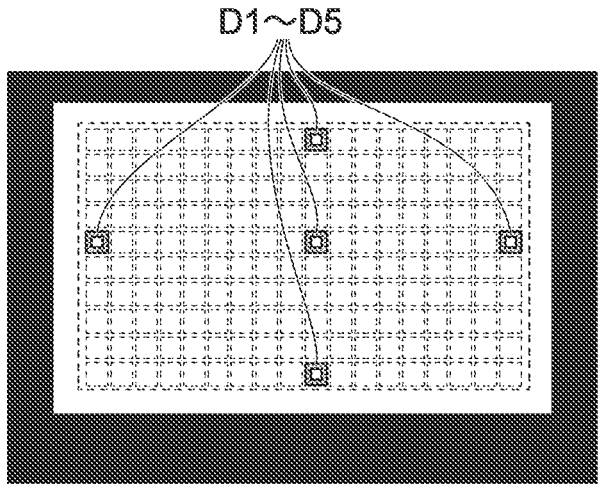

FIGS. 4A to 4C are diagrams showing the in-finder field of view, and show a state in which the finder 10 is operated (a state in which a visual recognition image is displayed).

As shown in FIG. 4A, the in-finder field of view includes a field mask 300, a focus detection region 400, 180 distance measurement point indexes 4001 to 4180, and the like.

Each of the distance measurement point indexes 4001 to 4180 is superimposed and displayed on a through image (live view image) displayed on the finder 10 so as to be displayed at a position corresponding to one of the plurality of focus detection points on the imaging face of the image pickup device 2 in the finder 10. Further, among the distance measurement point indexes 4001 to 4180, the distance measurement point index matching the position A which is the current first estimated gaze point position is set to the focal frame by the CPU 3 (setting unit), and is highlighted in the finder 10. In a case where the release button 5 is half-pressed, focus adjustment with the focal frame currently set in the finder 10 as the focus position is performed by the autofocus detection circuit 203 and the focus adjustment circuit 118 under the instruction of the CPU 3.

Next, a line-of-sight detection method by the image pickup system 1 will be described with reference to FIGS. 5 to 7.

Figure 5:
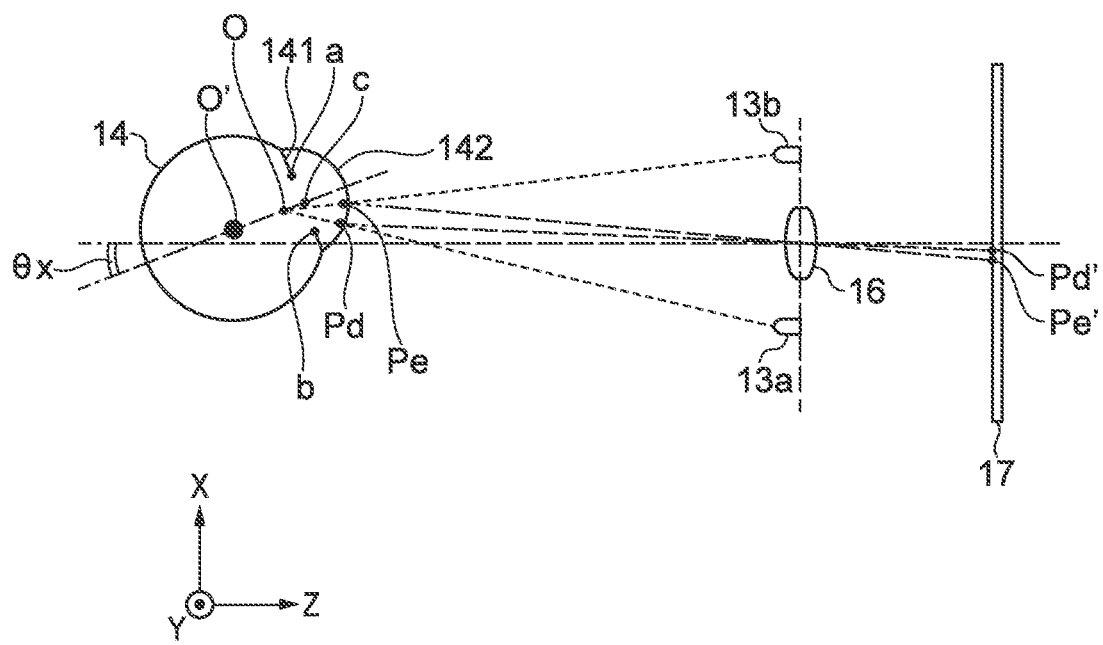
FIG. 5 is a diagram for describing a principle of a line-of-sight detection method.

FIG. 5 is a diagram for explaining the principle of the line-of-sight detection method, and is a schematic diagram of an optical system for performing line-of-sight detection.

In FIG. 5, the light sources 13a and 13b are light sources such as light emitting diodes that emit infrared light that is insensitive to the user, and the light sources are disposed substantially symmetrically with respect to the optical axis of the light receiving lens 16 and illuminate the eyeball 14 of the user. Part of the illumination light emitted from the light sources 13a and 13b and reflected by the eyeball 14 is condensed on the ocular image pickup device 17 by the light receiving lens 16.

Figure 6A:
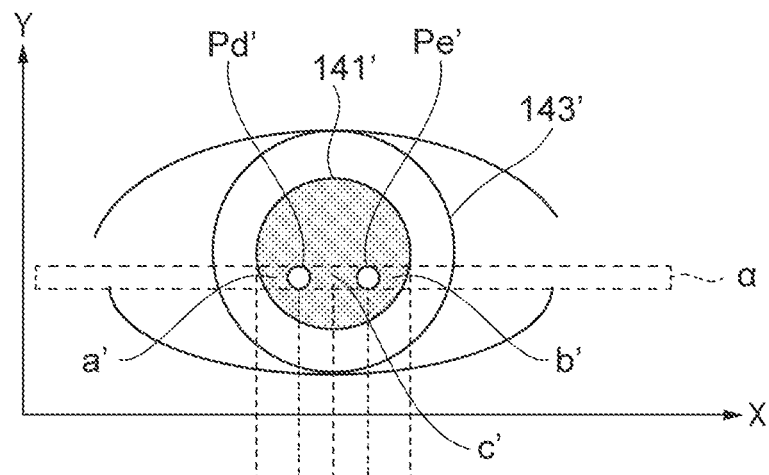
FIGS. 6A and 6B are diagrams for explaining a method for detecting coordinates corresponding to a corneal reflection image and a pupil center from eye image data.
Figure 6B:
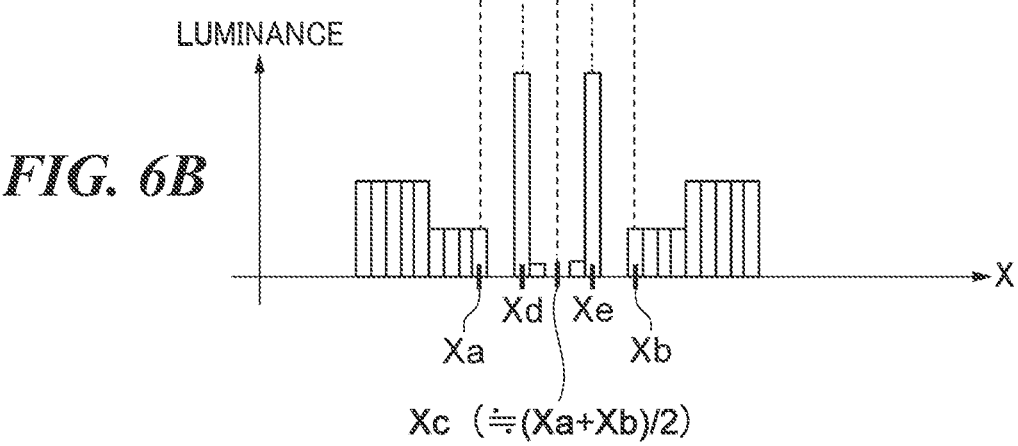

FIG. 6A is a schematic diagram of an eye image (eye image projected on the ocular image pickup device 17) picked up by the ocular image pickup device 17, and FIG. 6B is a diagram showing output intensity of a photoelectric element array in the ocular image pickup device 17.

Figure 7:
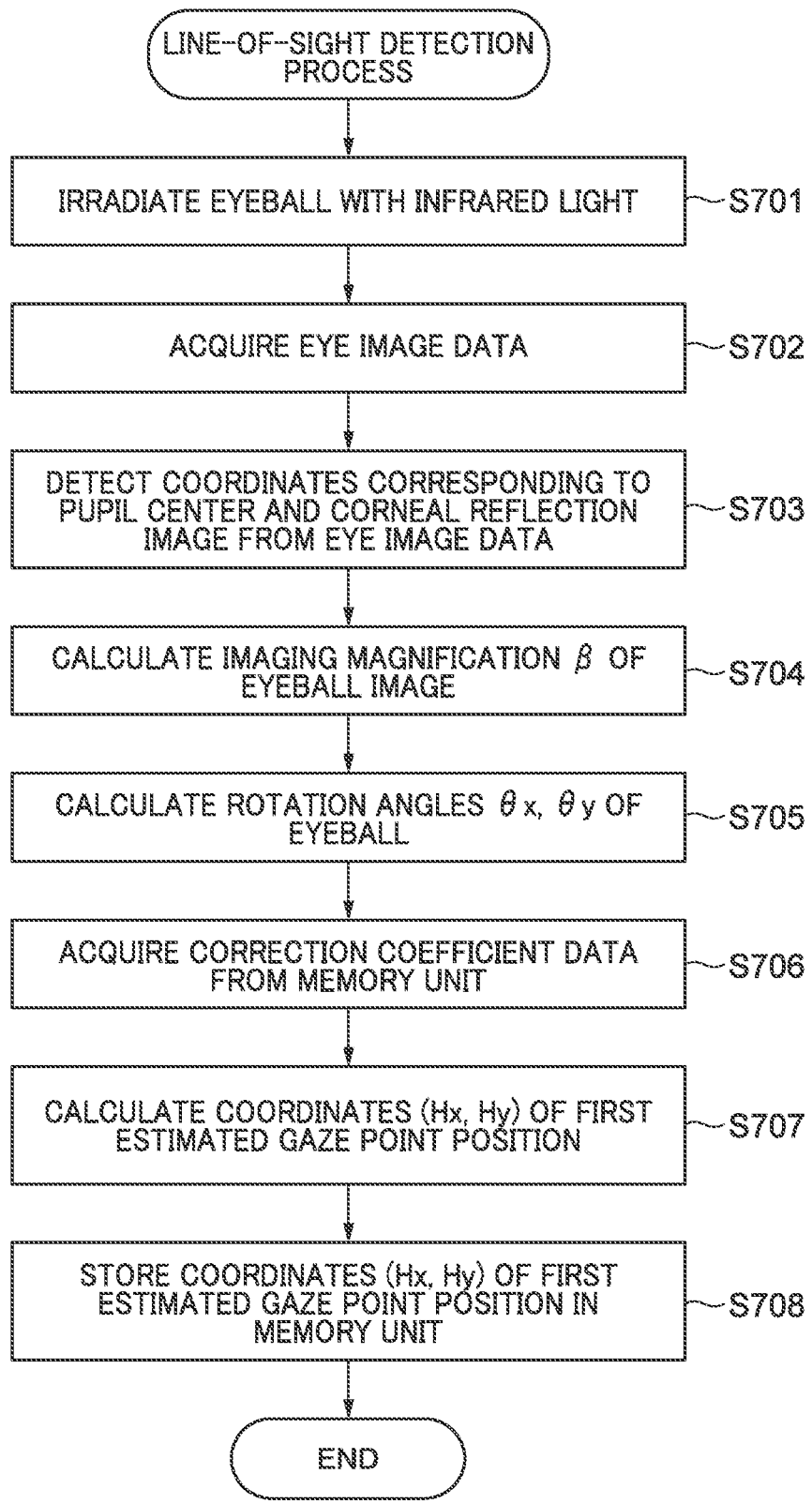
FIG. 7 is a flowchart of line-of-sight detection process.

FIG. 7 is a flowchart of a line-of-sight detection process. This process is executed by the CPU 3 reading a program recorded in a ROM (not shown in FIG. 3) in the camera housing 1B.

In FIG. 7, when the line-of-sight detection process starts, in step S701, the CPU 3 causes the light sources 13a and 13b to emit infrared light toward the eyeball 14 of the user. The eye image of the user when the eyeball is irradiated with the infrared light is formed on the ocular image pickup device 17 through the light receiving lens 16 and is photoelectrically converted by the ocular image pickup device 17. As a result, an electrical signal (eye image data) of a processable eye image is obtained.

In step S702, the CPU 3 acquires the eye image data obtained from the ocular image pickup device 17 from the ocular image pickup device 17 as described above.

In step S703, the CPU 3 detects coordinates corresponding to the corneal reflection images Pd and Pe of the light sources 13a and 13b and the pupil center c from the eye image data obtained in step S702.

The infrared light emitted from the light sources 13a and 13b illuminates the cornea 142 of the eyeball 14 of the user. At this time, the corneal reflection images Pd and Pe formed by part of the infrared light reflected by the surface of the cornea 142 are condensed by the light receiving lens 16 and formed on the ocular image pickup device 17 to become corneal reflection images Pd' and Pe' (FIG. 6A). Similarly, the pencil of light from the ends a and b of the pupil 141 are also imaged on the ocular image pickup device 17 to become pupil end images a' and b' (FIG. 6A).

FIG. 6B shows luminance information (luminance distribution) of a region α in the eye image of FIG. 6A. In FIG. 6B, the horizontal coordinate of the eye image is indicated by the X axis, and the luminance at the coordinate indicated by the X axis is indicated by the Y axis. In the present embodiment, coordinates of the corneal reflection images Pd' and Pe' in the X-axis direction (horizontal direction) are Xd and Xe, and coordinates of the pupil end images a' and b' in the X-axis direction are Xa and Xb. As shown in FIG. 6B, at the coordinates Xd and Xe of the corneal reflection images Pd' and Pe', extremely high level luminance is obtained. In a range larger than the coordinate Xa and smaller than the coordinate Xb, which corresponds to the region of the pupil 141 (the region of the pupil image 141' obtained by imaging the pencil of light from the pupil 141 on the ocular image pickup device 17), extremely low level luminance is obtained except for that at the coordinates Xd and Xe. On the other hand, in the region of the iris 143 outside the pupil 141 (the region of the iris image 143' outside the pupil image 141' obtained by imaging the pencil of light from the iris 143), intermediate luminance between the above two types of luminance is obtained. Specifically, intermediate luminance between the two types of luminance is obtained in a region where the X coordinate (coordinate in the X-axis direction) is smaller than the coordinate Xa and a region where the X coordinate is larger than the coordinate Xb.

The X coordinates Xd and Xe of the corneal reflection images Pd' and Pe' and the X coordinates Xa and Xb of the pupil end images a' and b' can be obtained from the luminance distribution as shown in FIG. 6B. Specifically, coordinates with extremely high luminance can be obtained as coordinates of the corneal reflection images Pd' and Pe', and coordinates with extremely low luminance can be obtained as coordinates of the pupil end images a' and b'. Furthermore, in a case where the rotation angle θx of the optical axis of the eyeball 14 with respect to the optical axis of the light receiving lens 16 is small, the coordinate Xc of the pupil center image c' (the center of the pupil image 141') obtained by imaging the pencil of light from the pupil center c on the ocular image pickup device 17 can be expressed as Xc≈(Xa+Xb)/2. That is, the X coordinate Xc of the pupil center image c' can be calculated from the X coordinates Xa and Xb of the pupil end images a' and b'. In this way, the X coordinates of the corneal reflection images Pd' and Pe' and the X coordinate of the pupil center image c' can be estimated.

Returning to FIG. 7, in step S704, the CPU 3 calculates the imaging magnification β of the eyeball image. The imaging magnification β is a magnification determined by the position of the eyeball 14 with respect to the light receiving lens 16, and can be obtained as a function of the distance (Xd−Xe) between the corneal reflection images Pd' and Pe'.

In step S705, the CPU 3 calculates the rotation angle of the optical axis of the eyeball 14 with respect to the optical axis of the light receiving lens 16. As shown in FIG. 5, the X coordinate of the midpoint between the corneal reflection image Pd and the corneal reflection image Pe substantially matches the X coordinate of the curvature center O of the cornea 142. Therefore, when a standard distance between the curvature center O of the cornea 142 and the center c of the pupil 141 is Oc, the rotation angle θx of the eyeball 14 in the Z-X plane (plane perpendicular to the Y axis) can be calculated by the following Equation 1. The rotation angle θy of the eyeball 14 in the Z-Y plane (plane perpendicular to the X axis) can also be calculated by a method similar to the method for calculating the rotation angle θx.

$$\beta \times Oc \times \text{SIN } \theta x \approx \{(Xd+Xe)/2\} - Xc \quad \text{(Equation 1)}$$

In step S706, the CPU 3 acquires the correction coefficient (the coefficient m and the line-of-sight correction coefficients Ax, Bx, Ay, By) from the memory unit 4. The coefficient m is a constant determined by the configuration of the finder optical system (the light receiving lens 16 or the like) of the image pickup system 1, is a conversion coefficient for converting the rotation angles θx and θy into coordinates corresponding to the pupil center c in the visual recognition image, is determined in advance, and is stored in the memory unit 4. In addition, the line-of-sight correction coefficients Ax, Bx, Ay, By are parameters for correcting individual differences of the eyeball, are acquired by performing calibration work to be described later, and are stored in the memory unit 4 before the present process is started.

In step S707, the CPU 3 instructs the line-of-sight detection circuit 201 to calculate the position of the viewpoint of the user (first estimated gaze point position) poured into the visual recognition image displayed on the finder 10. Specifically, the line-of-sight detection circuit 201 calculates the first estimated gaze point position using the rotation angles θx and θy of the eyeball 14 calculated in step S705 and the correction coefficient data acquired in step S706. Assuming that the coordinates (Hx, Hy) of the first estimated gaze point position are coordinates corresponding to the pupil center c, the coordinates (Hx, Hy) of the first estimated gaze point position can be calculated by the following Equations 2 and 3.

$$Hx = m \times (Ax \times \theta x + Bx) \quad \text{(Equation 2)}$$

$$Hy = m \times (Ay \times \theta y + By) \quad \text{(Equation 3)}$$

In step S708, the CPU 3 stores the coordinates (Hx, Hy) of the first estimated gaze point position calculated in step S706 in the memory unit 4, and terminates the present process.

As described above, in the line-of-sight detection process of the present embodiment, the first estimated gaze point position is calculated using the rotation angles θx and θy of the eyeball 14, and the correction coefficients (the coefficient m and the line-of-sight correction coefficients Ax, Bx, Ay, By) acquired in advance by the calibration work and the like described later.

However, there is a case where the first estimated gaze point position cannot be estimated with high accuracy due to factors such as individual differences in the shape of human eyeballs. Specifically, unless the values of the line-of-sight correction coefficients Ax, Ay, Bx, and By are adjusted to values suitable for the user, as shown in FIG. 4B, a deviation occurs between the position B at which the user actually gazes and the position C which is the first estimated gaze point position calculated in step S707. In FIG. 4B, the user is gazing at the person at position B, but the image pickup system 1 erroneously estimates that the user is gazing at the background at the position C which is the first estimated gaze point position. As a result, a state in which appropriate focus detection and adjustment with respect to the position B at which the user is gazing cannot be performed occurs.

Therefore, the CPU 3 (calibration unit) performs calibration work before the image pickup system 1 performs imaging (focus detection), and acquires the line-of-sight correction coefficients Ax, Ay, Bx, and By suitable for the user to store the line-of-sight correction coefficients Ax, Ay, Bx, and By in the memory unit 4.

In the related art, the calibration work is performed by highlighting a plurality of different calibration work indexes D1 to D5 at positions as shown in FIG. 4C on the finder 10 before picking up an image and allowing the user to gaze the indexes. Then, a technique of performing the line-of-sight detection process at the time of gazing at each of the indexes D1 to D5 to calculate the coordinates of the plurality of first estimated gaze point positions and obtaining line-of-sight correction coefficients Ax, Ay, Bx, By suitable for the user from the calculated coordinates and the coordinates of the gazed index is known as a known technique. It should be noted that as long as the position to be gazed by the user is suggested, the method is not limited to the highlighting method in which the positions of the indexes D1 to D5 are indicated by a square frame as shown in FIG. 4C. For example, the positions of the indexes D1 to D5 may be emphasized by changing luminance or color.

However, since a plurality of accessories other than the taking lens 1A is detachably mounted on the camera housing 1B of the present embodiment, it is known that a range in which the camera housing 1B can perform focus control varies depending on the accessory to be mounted.

Hereinafter, an optimal calibration method according to an accessory mounted on the camera housing 1B will be described with reference to FIGS. 8A, 8B, 9A, 9B, 10A, 10B, and 11.

Hereinafter, in the present embodiment, a case where in addition to the taking lens 1A, the taking lens 1A' having a narrower focus detection region than the taking lens 1A is detachably mounted on the camera housing 1B will be described. Specifically, the taking lens 1A and 1A' are a taking lens for a 35 mm full-size sensor (length: 36 mm, width: 24 mm) and a taking lens for an APS-C sensor (length: about 15.5 mm, width: about 23.3 mm), respectively, and have the same hardware configuration. However, the taking lens 1A and 1A' are not limited to the taking lens shown in the present embodiment as long as the focus detection regions are different from each other. For example, the taking lens 1A and 1A' may be taking lenses having the same target sensor but different performance.

Figure 8A:
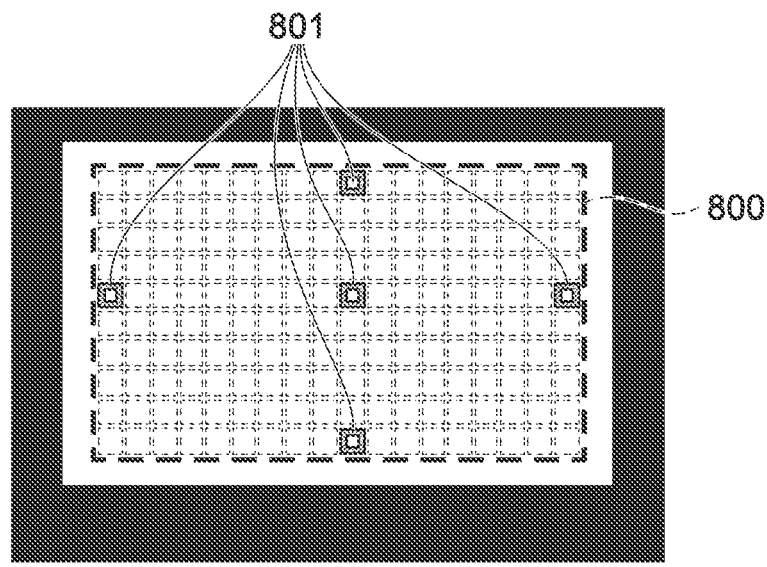
FIGS. 8A and 8B are diagrams showing an example of a focus detection region displayed in the in-finder field of view at the time of calibration in a case where each of the taking lenses having different focus detection regions is mounted on the camera housing in FIG. 1.
Figure 8B:
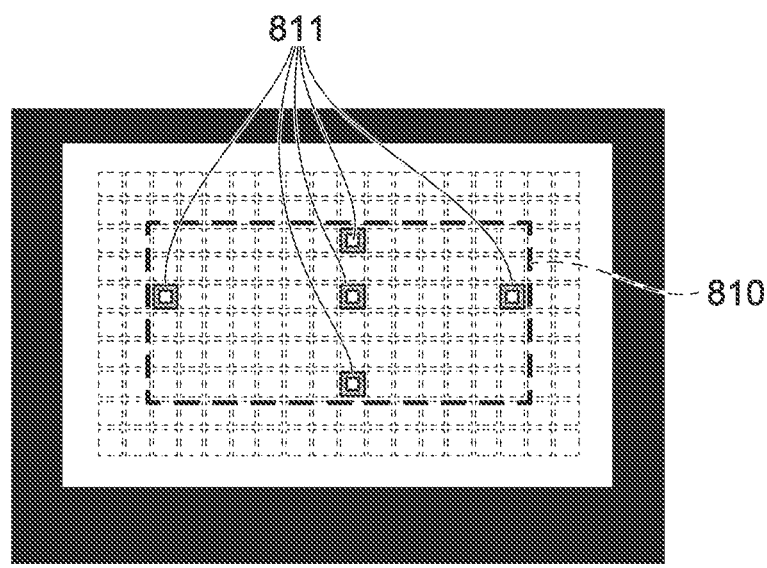

FIGS. 8A and 8B are diagrams showing examples of a focus detection region displayed in the in-finder field of view at the time of calibration in a case where each of the taking lenses having different focus detection regions is mounted on the camera housing 1B. FIG. 8A is a diagram showing a focus detection region 800 displayed in the in-finder field of view when the taking lens 1A is mounted on the camera housing 1B. FIG. 8B is a diagram showing a focus detection region 810 displayed in the in-finder field of view when the taking lens 1A' is mounted on the camera housing 1B. It should be noted that in FIGS. 8A and 8B, the description similar to that in FIGS. 4A to 4C is omitted.

As shown in FIG. 8A, indexes 801 for calibration work when the taking lens 1A is mounted on the camera housing 1B are displayed inside the focus detection region 800.

On the other hand, as shown in FIG. 8B, indexes 811 for calibration work when the taking lens 1A' is mounted are displayed inside the focus detection region 810.

In FIG. 8A, the focus detection region 800 covers the entire visual field area in the field mask 300 of the in-finder field of view. On the other hand, in FIG. 8B, the focus detection region 810 covers only part of the visual field area. Therefore, in a case where the indexes 801 are used in both FIGS. 8A and 8B, most of the indices are outside the focus detection region 810 in FIG. 8B, and thus, the accuracy of the line-of-sight detection is deteriorated. Conversely, in a case where the indexes 811 are used in both FIGS. 8A and 8B, there is no index at the end of the focus detection region 800 in FIG. 8A, and thus, the accuracy of line-of-sight detection deteriorates at the end of the focus detection region 800.

Therefore, in the present embodiment, as shown in FIGS. 8A and 8B, indexes for calibration work are set so as to be within the focus detection region according to the focus detection region of the taking lens mounted on the camera housing 1B.

It should be noted that in the examples of FIGS. 8A and 8B, the case where the number of indexes for calibration work is five is described, but the number of indexes is not limited thereto. That is, the display position and the size of the index, and the number of indexes for calibration work may be determined according to the focus detection region instead of the visual field area in the in-finder field of view.

In the examples of FIGS. 8A and 8B, the position of the calibration index is changed so as to be optimal according to the size of the focus detection region in order to suppress deterioration in accuracy of the line-of-sight detection while maintaining the time required for calibration. On the other hand, in the examples of FIGS. 9A and 9B described below, in a case where the focus detection region is wide, the number of indexes is changed to be increased although it takes time for calibration in order for the line-of-sight detection circuit 201 to have a level of line-of-sight detection accuracy same as that in a case where the focus detection region is narrow.

Figure 9A:
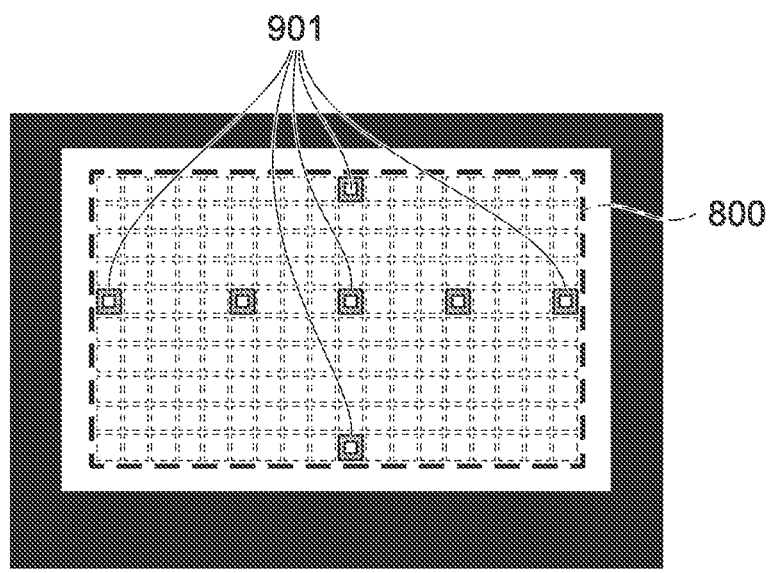
FIGS. 9A and 9B are diagrams showing another example of the focus detection region in the in-finder field of view at the time of calibration in case where each of the taking lenses having different focus detection regions is mounted on the camera housing.
Figure 9B:
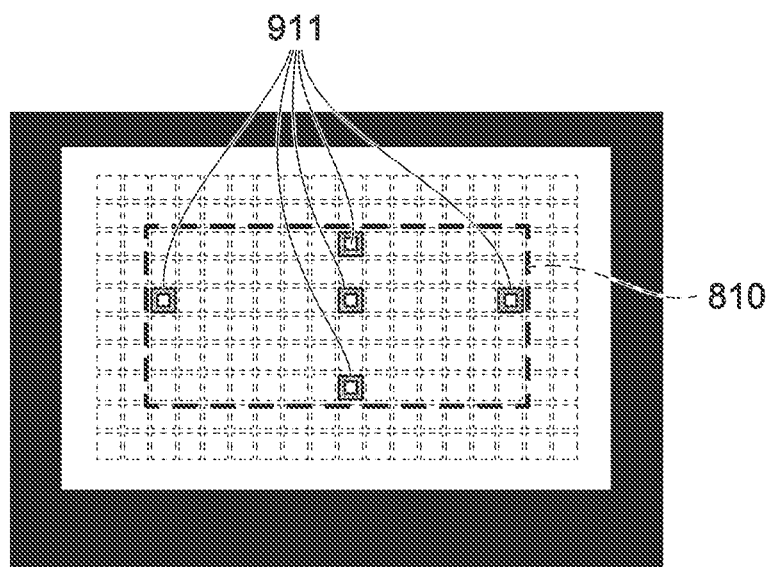

FIGS. 9A and 9B are diagrams showing another example of the focus detection region in the in-finder field of view at the time of calibration in case where each of the taking lenses having different focus detection regions is mounted on the camera housing 1B. In FIGS. 9A and 9B, the description similar to that in FIGS. 4A to 4C and FIGS. 8A and 8B is omitted.

FIG. 9A shows the focus detection region 800 displayed in the in-finder field of view when the taking lens 1A is mounted on the camera housing 1B. In addition, FIG. 9B shows the focus detection region 810 displayed in the in-finder field of view when the taking lens 1A' is mounted on the camera housing 1B.

As shown in FIG. 9A, seven indexes 901 for calibration work when the taking lens 1A is mounted on the camera housing 1B are displayed inside the focus detection region 800.

On the other hand, as shown in FIG. 9B, five indexes 911 for calibration work when the taking lens 1A' is mounted are displayed inside the focus detection region 810.

FIG. 9A is different from FIG. 8A in that the number of indexes 901 in FIG. 9A displayed inside the focus detection region 400 is larger than that of the indexes 801 in FIG. 8A.

As described above, in the calibration, the detection accuracy tends to be high in the vicinity of the gaze index, and the detection accuracy tends to be lower as the distance from the gaze index increases. Therefore, in another example shown in FIG. 9A, the number of indexes for calibration work displayed in the focus detection region is set according to the required line-of-sight detection accuracy. That is, in the example of FIG. 9A, the number of calibration work indexes in a case where the each of the taking lenses having different focus detection regions is mounted on the camera housing 1B is changed according to the focus detection region. As a result, the expected line-of-sight detection accuracy can be obtained with the minimum calibration time required.

The CPU 3 (display image changing unit) of the present embodiment has a viewing angle changing function of changing the finder field angle of the finder 10 including liquid crystal or the like. This function is used when the user reduces the size of the display image of the finder 10 and adjusts the display image such that the user can see the entire display image in a case where only part of the display image of the finder 10 can be seen even when the user looks into the eyepiece window 6, because, for example, the user wears glasses.

Figure 10A:
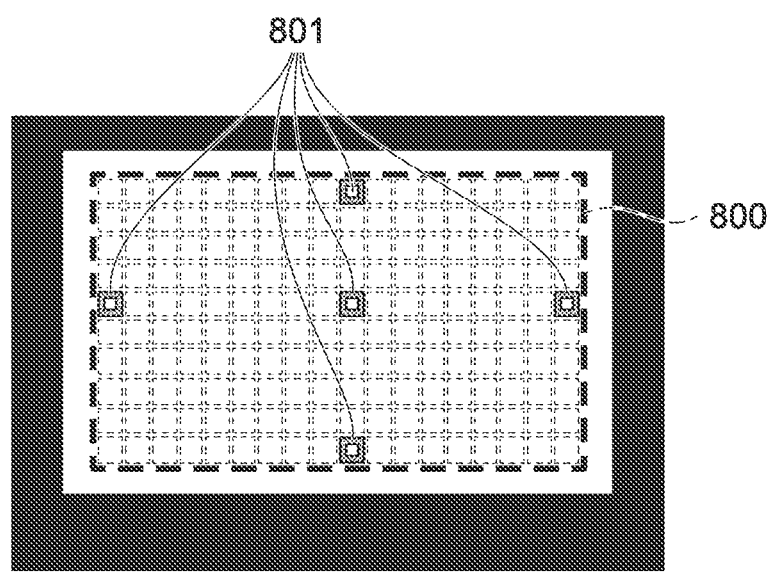
FIGS. 10A and 10B are diagrams showing an example of the focus detection region in the in-finder field of view at the time of calibration at each of the different finder field angles.
Figure 10B:
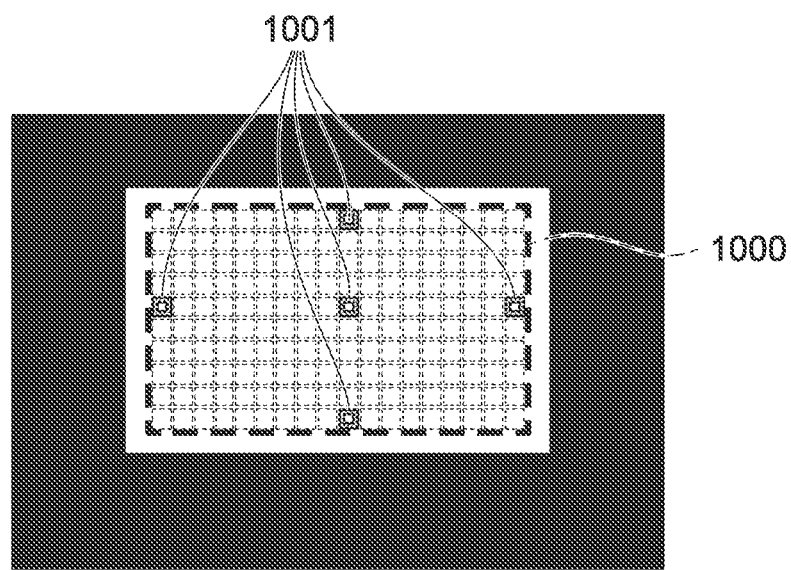

FIGS. 10A and 10B are diagrams showing an example of the focus detection region in the in-finder field of view at the time of calibration at each of the different finder field angles. In FIGS. 10A and 10B, the description similar to that in FIGS. 4A to 4C, FIGS. 8A and 8B, and FIGS. 9A and 9B is omitted.

FIGS. 10A and 10B both show the focus detection regions in the in-finder field of view when calibration is performed with the taking lens 1A mounted on the camera housing 1B.

FIG. 10A shows the focus detection region 800 in the in-finder field of view in a case where the finder field angle is initially set. FIG. 10B shows a focus detection region 1000 in the in-finder field of view when the user changes the finder field angle from the initial setting using the viewing angle changing function and reduces the size of the display image of the finder 10.

As shown in FIG. 10B, in a case where the size of the display image of the finder 10 is reduced by the viewing angle changing function after the taking lens 1A is mounted on the camera housing 1B, indexes 1001 for calibration work are displayed in the focus detection region 1000.

It should be noted that, in the display image of the finder 10 in any of FIGS. 10A and 10B, the number of distance measurement point indexes is 180, but the sizes thereof are different. As described above, when the size of the distance measurement point index is changed according to the size of the display image of the finder 10, the size of the index for calibration work is also changed accordingly.

It should be noted that FIGS. 10A and 10B show a case where the distance measurement point index and the calibration work index have the same size and shape, but the distance measurement point index and the calibration work index do not necessarily have the same size and shape. That is, at least one of the size and the shape of the calibration work index may be changed according to the size of the distance measurement point index in the in-finder field of view. For example, the distance measurement point index and the calibration work index may have different the sizes and the shapes, and the size of the calibration work index may be changed according to the change ratio of the distance measurement point index. In addition, when the size of the distance measurement point index falls below a preset threshold value, the size and/or the shape of the index for calibration work may be switched. Depending on the performance of the line-of-sight detection circuit 201, when the output image of the finder 10 is too small, it may be difficult to achieve line-of-sight detection accuracy for each distance measurement point index. In such a case, the calibration may be performed by changing the size of the calibration work index to the size of a plurality of distance measurement point indexes.

Figure 11:
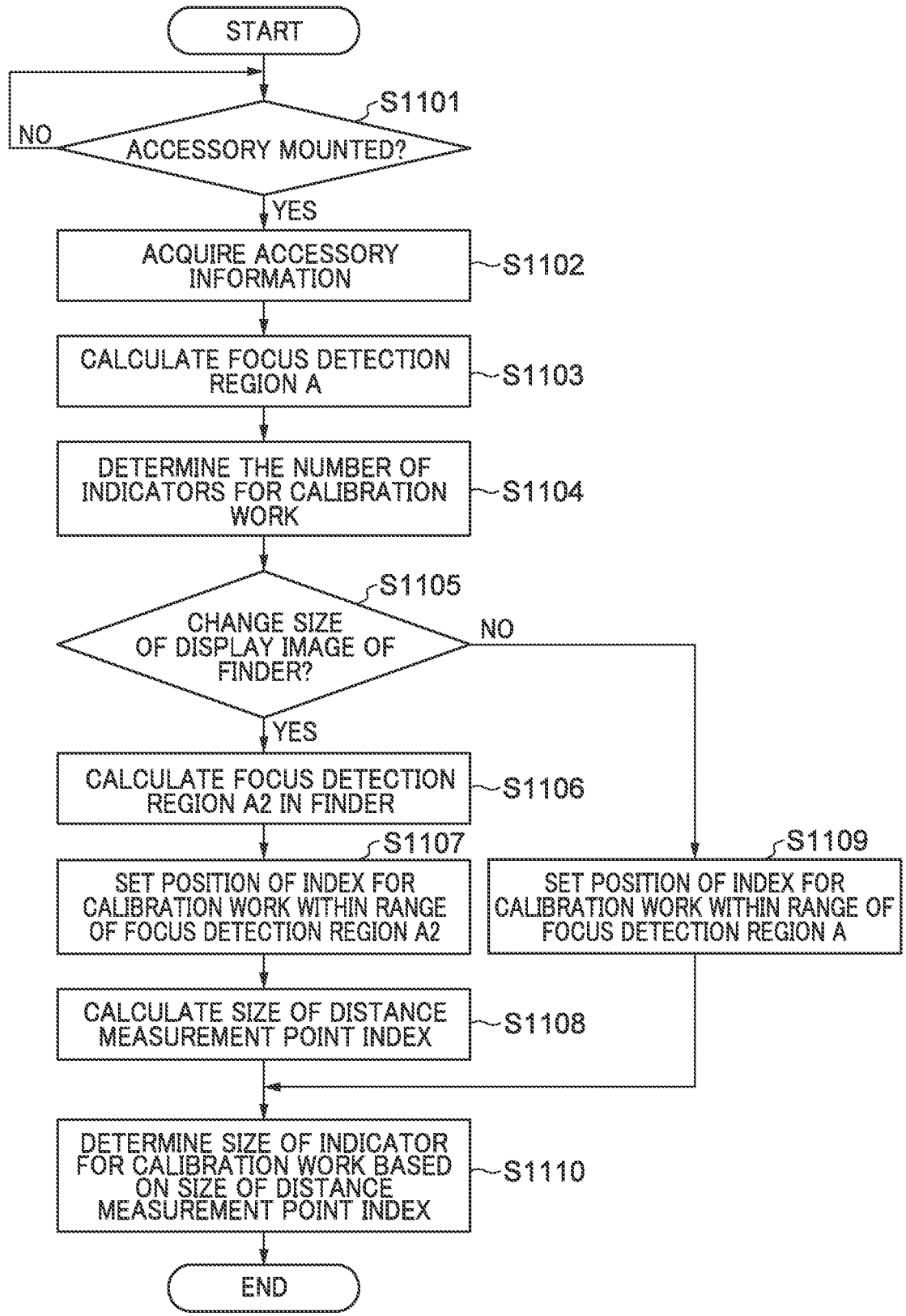
FIG. 11 is a flowchart of the calibration method determination process executed when the accessory is mounted on the camera housing.

FIG. 11 is a flowchart of the calibration method determination process executed when an accessory is mounted on the camera housing 1B. This process is executed by the CPU 3 reading a program recorded in a ROM (not shown in FIG. 3) in the camera housing 1B in a state where an accessory is not mounted on the camera housing 1B.

In step S1101, the CPU 3 determines whether an accessory is mounted on the camera housing 1B. Specifically, when the state of the signal output from the mount contact 117 changes, the CPU 3 determines that an accessory such as the taking lens 1A is mounted on the camera housing 1B. In a case where attachment of the accessory is detected, the process proceeds to step S1102. Hereinafter, in the present process, a case where the taking lens 1A as the accessory is mounted will be described as an example.

In step S1102, the CPU 3 communicates with the taking lens 1A via the mount contact 117 to acquire accessory information. The accessory information in the case of the taking lens 1A is type information, optical information, or the like of the two lenses 101, 102. In general, information specific to each lens is stored in a storage medium (not shown) inside the taking lens 1A, and the CPU 3 of the camera housing 1B acquires the information by communication with the taking lens 1A. After the accessory information is acquired, the process proceeds to step S1103.

In step S1103, the CPU 3 (focus detection region acquisition unit) calculates a focus detection region A based on the accessory information acquired in step S1102. The focus detection region A is the focus detection region 800 in FIG. 8A in a case where the accessory mounted on the camera housing 1B is the taking lens 1A, and is the focus detection region 810 in FIG. 8B in a case where the accessory mounted on the camera housing 1B is the taking lens 1A'. That is, it is uniquely determined from the optical information about the accessory to be mounted that the focus detection region A is which region. After the focus detection region A is calculated, the process proceeds to step S1104.

In step S1104, the CPU 3 determines the number of indexes for calibration work according to the expected value of the line-of-sight detection accuracy. The expected value of the line-of-sight detection accuracy may be set in advance in the CPU 3 or may be arbitrarily set by the user. As described above, since the detection accuracy of the calibration is generally high in the vicinity of the gaze index, the larger the number of calibration indexes therein is, the better. However, since the user is forced to perform a certain operation in the calibration process, a burden tends to increase. Therefore, instead of causing the user to set the expected value of the line-of-sight detection accuracy, the user may set an allowable time for calibration so that the number of calibration indexes can be set under the condition of the allowable time. After the number of calibration indexes is determined, the process proceeds to step S1105.

In step S1105, the CPU 3 determines whether the size of the display image of the finder 10 has been changed by the user using the viewing angle changing function. The reason why the user dares to change the display image of the finder 10 in this manner is described in FIGS. 10A and 10B, and thus the description thereof is omitted. As a result of the determination, in a case where the size of the display image of the finder 10 has been changed, the process proceeds to step S1106, and in a case where the size has not been changed, the process proceeds to step S1109. In the present embodiment, when the value of the viewing angle is different from the initial setting, the CPU 3 determines that the size of the display image of the finder 10 has been changed, but the present invention is not limited thereto. For example, the size of the display image of the finder 10 at the time of the previous calibration may be stored, and the size at that time may be compared with the current size, so that it may be determined whether the size of the display image of the finder 10 has changed.

In step S1106, the CPU 3 calculates a focus detection region A2 (the focus detection region 1000 in FIG. 10B) by multiplying the focus detection region A acquired in step S1103 by the change ratio of the size of the display image of the finder 10. After the focus detection region A2 is calculated, the process proceeds to step S1107.

In step S1107, the CPU 3 determines a position of the calibration index so that the position falls within the focus detection region A2 acquired in step S1106. The details of the method for determining the position of the calibration index are as described with reference to FIGS. 8A and 8B. After the position of the calibration index is determined, the process proceeds to step S1108.

In step S1108, the CPU 3 calculates the size of the distance measurement point index by multiplying the size of the initially set distance measurement point index by the change ratio of the size of the output image of the finder 10, and updates the size of the distance measurement point index held in the memory unit 4 with the calculated value. Thereafter, the process proceeds to step S1110.

In step S1109, the CPU 3 determines a position of the calibration index so that the position falls within the focus detection region A acquired in step S1103. The details of the method for determining the position of the calibration index are as described with reference to FIGS. 8A and 8B. After the position of the calibration index is determined, the process proceeds to step S1110.

In step S1110, the CPU 3 determines the size of the calibration index according to the size of the distance measurement point index held in the memory unit 4. The details of the method for determining the size of the calibration index are as described with reference to FIGS. 10A and 10B. Thereafter, this process ends.

According to the process of FIG. 11, since the optimum number and size of calibration indexes are displayed on the finder 10 at the time of calibration according to the focus detection region, it is possible to maintain the line-of-sight detection accuracy at the time of calibration.

Second Embodiment

Hereinafter, recalibration in a case where a focus controllable range changes due to a difference in accessory (here, the taking lens) detachably mounted on the camera housing according to the second embodiment of the present invention will be described with reference to FIGS. 12, 13, 14A, and 14B.

It should be noted that in the present embodiment, the same reference numerals are given to the same configurations as those of the first embodiment, and redundant description will be omitted.

In the first embodiment, the calibration method when the taking lens 1A is mounted on the camera housing 1B is described. On the other hand, in the present embodiment, a method for recalibration in a case where the taking lens mounted on the camera housing 1B is changed to the taking lens 1A after calibration is performed when the taking lens 1A' is mounted on the camera housing 1B will be described.

Figure 12:
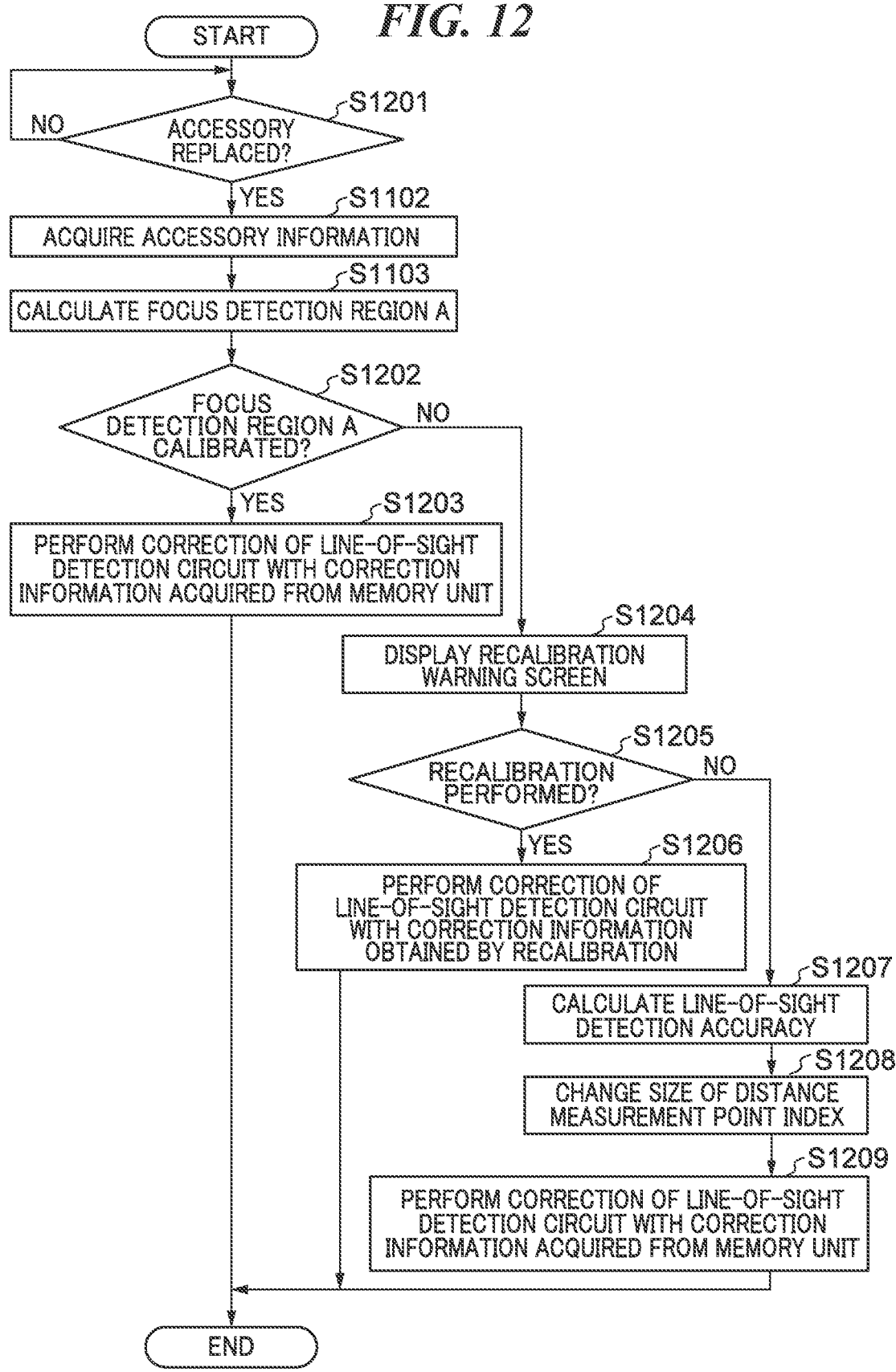
FIG. 12 is a flowchart of recalibration method determination process executed at the time of replacement of the accessory mounted on the camera housing.

FIG. 12 is a flowchart of recalibration method determination process executed at the time of replacement of an accessory mounted on the camera housing 1B. This process is executed by the CPU 3 reading a program recorded in a ROM (not shown in FIG. 3) in the camera housing 1B in a state where an accessory is mounted on the camera housing 1B. Among the steps in FIG. 12, steps having the same contents as those in FIG. 11 are denoted by the same reference numerals, and redundant description is omitted.

In step S1201, the CPU 3 determines whether the accessory mounted on the camera housing 1B has been replaced. Specifically, when the state of the signal output from the mount contact 117 changes, the CPU 3 determines that the replaced accessory is mounted on the camera housing 1B. Hereinafter, in the present process, a case where the accessory mounted on the camera housing 1B is replaced from the taking lens 1A' to the taking lens 1A will be described as an example.

As a result of the determination, when replacement of the accessory is detected (YES in step S1201), the process proceeds to steps S1102 and S1103. Here, since steps S1102 and S1103 are described above with reference to FIG. 11, the description thereof is omitted. After step S1103, the process proceeds to step S1202.

In step S1202, the CPU 3 determines whether the focus detection region A calculated in step S1103 has been calibrated in the past. In the present embodiment, every time calibration is performed in the past, the focus detection region and the correction information (the line-of-sight correction coefficients Ax, Bx, Ay, By) obtained by the calibration are stored in the memory unit 4 (storage unit) in association with each other. Then, in a case where the focus detection region A of the newly mounted taking lens 1A by replacement of the accessory in step S1201 is stored in the memory unit 4, the CPU 3 determines that the focus detection region A has been calibrated in the past. It should be noted that in a case where a plurality of users use the camera housing 1B, information about the user who has performed the calibration is also stored every time calibration has been performed in the past. In this case, in step S1202, it is determined, by using the information about the user, whether the user who is currently using the camera housing 1B has calibrated the focus detection region A in the past.

As a result of the determination, in a case where the focus detection region A of the newly mounted taking lens 1A has been calibrated (YES in step S1202), the process proceeds to step S1203, and in a case where the focus detection region A has not been calibrated yet (NO in step S1202), the process proceeds to step S1204.

In step S1203, the CPU 3 (calibration unit) acquires, from the memory unit 4, correction information obtained in past calibration for the focus detection region A of the newly mounted taking lens 1A, and corrects the line-of-sight detection circuit 201. Thereafter, this process ends.

In step S1204, the CPU 3 displays a warning screen prompting recalibration on the finder 10. This warning screen will be described later with reference to FIG. 13. After the warning screen is displayed, the process proceeds to step S1205.

In step S1205, the CPU 3 determines whether recalibration has been performed or a user instruction not to perform recalibration has been issued. As a result of the determination, in a case where recalibration has been performed (YES in step S1205), the process proceeds to step S1206. On the other hand, in a case where a user instruction not to perform recalibration has been issued (NO in step S1205), the process proceeds to step S1207. Here, the user instruction not to perform recalibration is, for example, a user instruction issued in a case where it is desired to use line-of-sight detection without recalibration, such as a case where it is desired to perform shooting quickly. Specifically, in a case where the user performs a cancel operation on the warning screen being displayed on the finder 10 using the operation members 41 to 43 or in a case where the release button 5 is pressed, the CPU 3 determines that a user instruction not to perform recalibration has been issued. However, the user instruction not to perform recalibration is not particularly limited to this, and various methods such as notifying the camera housing 1B that recalibration is not to be performed using voice can be used.

In step S1206, the CPU 3 performs line-of-sight detection using correction information obtained by recalibration, which is determined to have been performed in step S1205, corresponding to the focus detection region A of the newly mounted taking lens 1A. Thereafter, this process ends.

In step S1207, when the correction information stored in the memory unit 4 is used, the CPU 3 (calculation unit) calculates the degree of line-of-sight detection accuracy with respect to the focus detection region A. The line-of-sight detection accuracy can be calculated from how far the distance between the calibration indexes is apart, the number of times of execution of calibration, and the like. Thereafter, the process proceeds to step S1208. It should be noted that in a case where a plurality of pieces of correction information is stored in the memory unit 4, correction information obtained by calibration corresponding to a focus detection region having the smallest error with the focus detection region A of the newly mounted taking lens 1A may be selected. In addition, line-of-sight detection accuracy at each time of past calibrations may be calculated, and correction information with highest accuracy may be selected, or correction information obtained by calibration corresponding to a region larger than the focus detection region A may be selected.

In step S1208, the CPU 3 changes the size of the distance measurement point index according to the line-of-sight detection accuracy calculated in step S1207, and displays the distance measurement point index on the finder 10. The method for determining the changed size of the distance measurement point index will be described later with reference to FIGS. 14A and 14B. Thereafter, the process proceeds to step S1209.

In step S1209, the CPU 3 corrects the line-of-sight detection circuit 201 using the correction information stored in the memory unit 4 for the newly mounted taking lens 1A. It should be noted that when a plurality of pieces of correction information is stored in the memory unit 4, the correction information selected by the method described above in step S1207 is used. Thereafter, this process ends.

Figure 13:
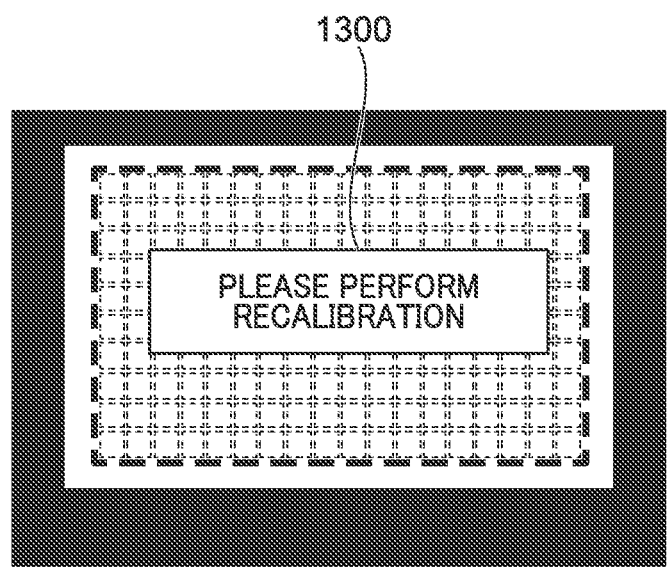
FIG. 13 is an example of a recalibration warning screen displayed on the finder in the step of FIG. 12.

FIG. 13 is an example of a recalibration warning screen displayed on the finder 10 in step S1204 of FIG. 12. It should be noted that in FIG. 13, the description similar to that in FIGS. 4A to 4C is omitted.

As shown in FIG. 13, a warning message 1300 prompting recalibration is displayed on the warning screen. In the present embodiment, the remark that "Please perform recalibration" is exemplified as the warning message 1300, but the warning message is not limited thereto. In addition, the display of the warning screen in FIG. 13 may be canceled after display for a predetermined time.

In addition, the warning screen of FIG. 13 may be displayed again in a predetermined period until recalibration is performed or a user instruction not to perform recalibration is issued in step S1205.

Figure 14A:
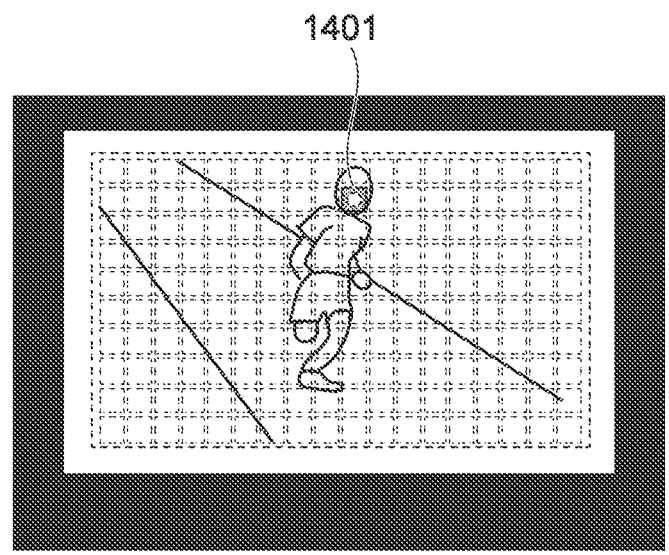
FIGS. 14A and 14B are diagrams for explaining a distance measurement point index whose size is determined according to line-of-sight detection accuracy in the step of FIG. 12 and displayed on the finder.
Figure 14B:
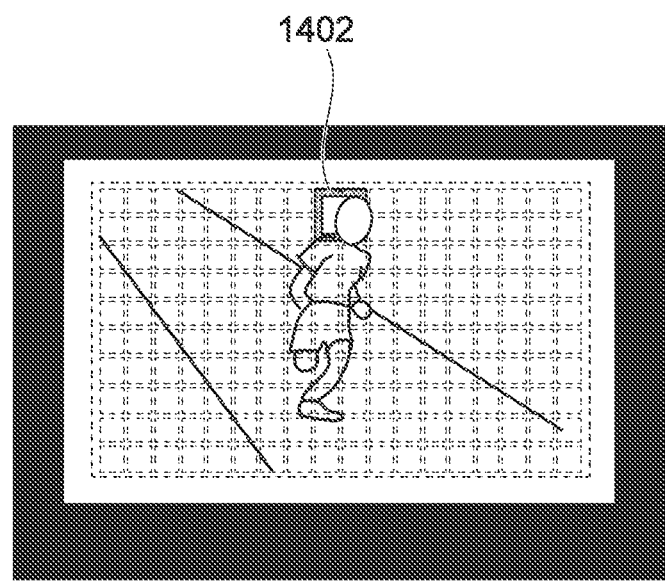

FIGS. 14A and 14B are diagrams for explaining a distance measurement point index whose size is determined according to line-of-sight detection accuracy in step S1208 in FIG. 12 and displayed on the finder 10. It should be noted that in FIGS. 14A and 14B, the description similar to that in FIGS. 4A to 4C is omitted.

FIG. 14A is a diagram showing a focal frame 1401 at the time of shooting in a case where calibration corresponding to the focus detection region A can be performed.

FIG. 14B is a diagram showing a focal frame 1402 at the time of shooting in a case where calibration corresponding to the focus detection region A has not been performed.

As shown in FIG. 14B, by increasing the size of the distance measurement point index according to the line-of-sight detection accuracy, it is possible to have a configuration such that the focal frame is not set at a position not intended by the user. Furthermore, in the present embodiment, in a case where the optimum calibration has been performed, a round shape (first display object) such as the focal frame 1401 is set. On the other hand, in a case where the optimum calibration has not been performed and the focal frame is large, a rhombus (second display object) such as the focal frame 1402 is set. However, as long as the user can recognize whether the optimum calibration has been completed, the focal frame 1402 is not limited to the embodiment of the present embodiment, and may be displayed in another shape or color, for example. Furthermore, the remark that "Please perform recalibration" may be displayed near the focal frame 1402.

With the above configuration, line-of-sight detection can be performed using an optimal calibration result at the time of replacement of an accessory mounted on the camera housing 1B.

Although the preferred embodiments of the present invention have been described above, the present invention is not limited to these embodiments, and various modifications and changes can be made within the scope of the gist of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-077482, filed Apr. 30, 2021 which is hereby incorporated by reference herein in its entirety.

What is claimed is:

1. An image pickup apparatus including a finder inside, the image pickup apparatus on which a plurality of accessories is detachably mounted, the image pickup apparatus comprising:
   at least one processor; and
   a memory coupled to the at least one processor, the memory having instructions causing the processor to perform the operations as:
   a line-of-sight detection unit configured to detect a position of line-of-sight, of a user, poured into the finder;
   a calibration unit configured to display an index for calibration work on the finder, acquire correction information about an individual difference of an eyeball by calibration based on a display position of the index in the finder and a position of line-of-sight, of the user, detected by said line-of-sight detection unit, the position of line-of-sight being poured into the index, and perform correction of the detected position of line-of-sight using the correction information;
   a setting unit configured to display a through image on the finder, and set to a focal frame, a position of line-of-sight, of the user, detected by said line-of-sight detection unit, the line-of-sight position being poured into the through image; and
   a focus detection region acquisition unit configured to acquire, when one of the accessories is mounted on the image pickup apparatus, a focus detection region from the mounted accessory,
   wherein said calibration unit changes a method for the calibration according to the acquired focus detection region.

2. The image pickup apparatus according to claim 1, wherein said calibration unit performs a setting such that the wider a focus detection region of the mounted accessory among the plurality of accessories is, the more the number of the indexes displayed on the finder is.

3. The image pickup apparatus according to claim 1, further comprising a display image change unit configured to change a size of a display image of the finder, and
   wherein said calibration unit
   changes a size of each of a plurality of distance measurement point indexes displayed on the finder according to a size of the display image changed by said display image change unit, and
   changes, according to the size of each of the changed distance measurement point indexes, at least one of a size and a shape of the index.

4. The image pickup apparatus according to claim 1, further comprising a storage unit configured to store, every time one of the accessories is mounted on the image pickup apparatus, a focus detection region of the mounted accessory and the correction information acquired by said calibration unit in association with each other, and when one of the accessories is newly mounted on the image pickup apparatus, in a case where a focus detection region of the newly mounted accessory is the same as a focus detection region stored in said storage unit, said calibration unit calibrates said line-of-sight detection unit using correction information stored in association with the focus detection region stored in said storage unit.

5. The image pickup apparatus according to claim 4, wherein in a case where a focus detection region of the newly mounted accessory is different from a focus detection region stored in said storage unit, a warning screen prompting recalibration by said calibration unit is displayed on the finder.

6. The image pickup apparatus according to claim 5, wherein when a user instruction not to perform recalibration by said calibration unit is issued after the warning screen is displayed on the finder, said line-of-sight detection unit is calibrated using correction information stored in association with a focus detection region stored in said storage unit.

7. The image pickup apparatus according to claim 6, further comprising a calculation unit configured to calculate line-of-sight detection accuracy for a focus detection region of the newly mounted accessory in a case where correction information stored in association with a focus detection region stored in said storage unit is used when the user instruction issued,
wherein a size of the focal frame is determined according to the calculated line-of-sight detection accuracy.

8. The image pickup apparatus according to claim 7, wherein a first display object displayed as the focal frame in a case where a focus detection region of the newly mounted accessory is the same as a focus detection region stored in said storage unit, and a second display object displayed as the focal frame in a case where a focus detection region of the newly mounted accessory is different from a focus detection region stored in said storage unit are different from each other in terms of at least one of shape and color.

9. The image pickup apparatus according to claim 1, wherein said calibration unit changes the method for the calibration by changing the display position of the index in the finder.

10. The image pickup apparatus according to claim 9, wherein said calibration unit brings, in a case where the acquired focus detection region of the mounted accessory is a first region, the display position of the index in the finder closer o the end of the finder than in a case where the acquired focus detection region of the mounted accessory is a second region narrower than the first region.

11. The image pickup apparatus according to 10, wherein said calibration unit performs a setting such that the wider the acquired focus detection region of the mounted accessory, the closer to the end of the finder is the display position of the index in the finder.

12. The image pickup apparatus according to claim 9, wherein said calibration unit performs a setting such that the display position of the index in the finder falls within the range of the acquired focus detection region of the mounted accessory.

13. A control method for controlling an image pickup apparatus including a finder inside, the image pickup apparatus on which a plurality of accessories is detachably mounted, the control method comprising:
 detecting a position of line-of-sight, of a user, poured into the finder;
 displaying an index for calibration work on the finder;
 acquiring correction information about an individual difference of an eyeball by calibration based on a display position of the index in the finder and a position of line-of-sight, of the user, detected by said detecting, the position of line-of-sight being poured into the index;
 performing correction of the detected position of line-of-sight using the correction information;
 displaying a through image on the finder;
 setting to a focal frame, a position of line-of-sight, of the user, detected by said detecting, the line-of-sight position being poured into the through image;
 acquiring, when one of the accessories is mounted on the image pickup apparatus, a focus detection region from the one mounted accessory; and
 changing a method for the calibration according to the acquired focus detection region.

14. A non-transitory computer-readable storage medium storing a program for causing a computer to execute a control method comprising:
 detecting a position of line-of-sight, of a user, poured into the finder;
 displaying an index for calibration work on the finder;
 acquiring correction information about an individual difference of an eyeball by calibration based on a display position of the index in the finder and a position of line-of-sight, of the user, detected by said detecting, the position of line-of-sight being poured into the index;
 performing correction of the detected position of line-of-sight using the correction information;
 displaying a through image on the finder;
 setting to a focal frame, a position of line-of-sight, of the user, detected by said detecting, the line-of-sight position being poured into the through image;
 acquiring, when one of the accessories is mounted on the image pickup apparatus, a focus detection region from the one mounted accessory; and
 changing a method for the calibration according to the acquired focus detection region.

\* \* \* \* \*